United States Patent [19]

Azzarella et al.

[11] Patent Number: 4,614,595
[45] Date of Patent: Sep. 30, 1986

[54] METHOD OF WATER TREATMENT

[75] Inventors: Michael Azzarella, Palm Springs, Calif.; Frederick L. Luth, Garland, Tex.

[73] Assignee: Coral, Inc., Waukegan, Ill.

[21] Appl. No.: 748,568

[22] Filed: Jun. 24, 1985

Related U.S. Application Data

[63] Continuation of Ser. No. 647,938, Sep. 5, 1984, abandoned.

[51] Int. Cl.⁴ .............................................. C02F 1/50
[52] U.S. Cl. ................................. 210/754; 210/755; 210/765; 422/37
[58] Field of Search ............................ 210/754–756, 210/765, 742, 746; 422/37

[56] References Cited

U.S. PATENT DOCUMENTS

| | | | |
|---|---|---|---|
| 2,580,808 | 1/1952 | Marks et al. | 20/755 |
| 3,123,554 | 3/1964 | Murray | 210/756 |
| 4,389,318 | 6/1983 | Wojtowicz | 210/755 |

OTHER PUBLICATIONS

Handbook of Chlorination, White, Van Nostrand Reinhold Company, 1972.
J. Am. W.W.A., vol. 33, No. 12, pp. 2079–2123, Dec. 1941.
J.W.P.C.F., vol. 46, No. 8, pp. 1974–1983, Aug. 1974.
Applied Microbiology, vol. 17, No. 3, pp. 415–421, 1969.
Water & Sewage Works, pp. 361–363, Sep. 1962.
Applied Microbiology, vol. 14, No. 1, pp. 8–11, 1966.
Water and Wastes Engineering, pp. 69–71, Nov. 1975.
J.W.P.C.F., vol. 37, No. 9, pp. 1256–1262, Sep. 1965.
Water and Wastes Engineering, pp. 27–29, 46, Feb. 1976.
J.A.W.W.A., vol. 52, No. 2, pp. 215–233, Feb. 1959.
J.A.W.W.A., vol. 40, No. 12, pp. 1305–1312, Dec. 1948.
Kirk–Othmer, 3rd Ed., vol. 5, pp. 565–580.
Kirk–Othmer, 3rd Ed., vol. 24, pp. 388–391.
Kirk–Othmer, 3rd Ed., vol. 24, pp. 427–441.

Primary Examiner—Tom Wyse
Attorney, Agent, or Firm—Fitch, Even, Tabin & Flannery

[57] ABSTRACT

Method for clarifying bodies of water and removing staining from the containers therefor, particularly swimming pools, by the addition of chlorine and/or bromine ion and ammonium ion to the water.

14 Claims, No Drawings

METHOD OF WATER TREATMENT

This application is a continuation of Ser. No. 647,938, filed Sept. 5, 1984, now abandoned.

The present invention relates generally to an improved method of water treatment and, more particularly, to an improved method for the treatment of swimming pool water to effect decolorizing of color bodies in the water and on the walls and bottom of the pool.

Stored bodies of water, for example swimming pools, unless cared for in accordance with strict regimens, act as breeding grounds for various types of algae which grow in the water and on the sides and bottom of the pool. Algae known as green algae and yellow or mustard algae are particularly troublesome in swimming pools. Green algae are typically waterborne algae. Once established in pool water green algae are difficult to eradicate other than by shocking the pool with massive doses of chlorine. In most instances this practice is effective on green algae, but takes an inordinate length of time, e.g., 72 hours to clear the water.

Yellow algae grows principally on the walls of the pool and appears as a yellow-brown stain. Yellow algae are not removed by shocking the pool and once a pool becomes infested the most effective and usual way to eliminate yellow algae is to drain the pool and manually scrub the algae from the wall surfaces. This is time consuming and expensive.

Many agents have been proposed and used for the treatment of stored water bodies as in ponds, lakes, reservoirs, storage tanks, cooling systems, spray ponds, and the like. However, many of these agents are harmful or undesirable to humans. Others, when added, while effectively acting as bacteriostatic, algaestatic, and slime-control agents, have not functioned to decolorize and or eliminate yellow and green algae once they have become established.

U.S. Pat. No. 2,140,401, issued Dec. 13, 1938, discloses the prevention of the growth of algae and the killing of algae in stored waters. The patent teaches the utilization of a copper salt in combination with a water-soluble ammonium salt. However, the presence of copper salts in stored water bodies is not desirable and is to be avoided if at all possible. Further, the copper salt and water-soluble ammonium salt combination does not function to decolorize yellow and green algae stains which occur in swimming pools.

U.S. Pat. No. 2,400,863, issued May 21, 1946, also discloses an algicide which is comprised of a mixture of a water-soluble inorganic copper salt and an aliphatic hydroxy acid. Again, the copper ion is undersirable in water bodies, even though it is, as pointed out in the patent, extremely lethal to water parasites.

U.S. Pat. No. 3,681,492, issued Aug. 1, 1972, discloses the mixing of a copper salt with an ascorbic acid composition.

U.S. Pat. No. 4,030,907, issued June 21, 1977, discloses a copper algicide of increased stability, the composition being a complex of a copper salt with an alkanolamine and an ammonium compound. Again, reliance is placed upon copper to be present in the water system for effective treatment to destroy algae.

U.S. Pat. No. 3,690,860, issued Sept. 12, 1972, is directed to a method for controlling slime in aqueous systems. This patent teaches slime control by the addition of an inorganic monopersulfate salt with an alkali metal halide. The patent contains no disclosure of the decolorizing and destaining of containers for water bodies. The principal thrust of the patent is to control slime in the system prior to any formation thereof.

Thus, the prior art is primarily directed to the use of a bactericide, algicide, or slime-control agent to prevent development of bacteria, algae, and/or slime bodies and does not teach the removal and/or decolorizing of yellow and green algae after they have developed in the water system as well as the clarifying of the water in the system.

It is known that the presence of ammonium ion or ammonia in water interferes with the disinfecting action of hypochlorus acid, although the precise mechanism is not understood. It is also known that fertilizer, which contains ammonium salts, stimulates algae growth in lakes and rivers.

Ammonia reacts with chlorine to form chloramines in accordance with well-known reactions. Chloramines have been used in potable water treatment to provide a source of combined available chlorine. However the presence of chloramines in swimming pool water has generally been thought to be undesirable since chloramines impart a disagreeable taste and color to the water and may cause irritation of the eyes and mucus membranes. Accordingly, conditions which promote chloramine formation are avoided.

The chlorination of swimming pool water is typically effected by an automatic feeder which meters a liquid or dry source of chlorine into the pool on a continuous basis. It is also possible to manually add the chlorine source, but this must be done frequently as chlorine is rapidly dissipated upon exposure to sunlight and oxygen.

The chlorine content of pool water is monitored colormetrically, typically using the Palin DPD Test using N,N-diethyl-p-phenylenediamine. The colormetric test measures OCl content or free available chlorine (FAC) and total available chlorine (TAC). By subtracting FAC from TAC the amount of combined available chlorine (CAC) may be calculated. Chloramines are a source of combined available chlorine and determination of CAC in a pool gives a reasonably accurate reading of the chloramine content.

A principal object of this invention is the provision of an improved method for clarifying water and decolorizing yellow and green algae.

A further object of the invention is the provision of an improved method for cleaning swimming pools of yellow and/or green algae stains in a relatively short period of time which is completely safe to humans.

Still further objects and advantages of this invention will be apparent by reference to the following description.

SUMMARY OF THE INVENTION

The present invention is directed to a water treatment method which includes adding to the water a source of ammonium ion and a source of chlorine ion and/or bromine ion. More particularly, the invention is directed to a method of treating water to decolorize algae and to remove undesired stains caused thereby by admixing with the water between about 2 and about 10 ppm ammonium ion and between about 2.75 and about 24.44 ppm chlorine ion and/or bromine ion, and mixing the water until the algae and/or color bodies have been substantially decolorized. Decolorization typically occurs within a matter of hours, and is completed within 24 hours, after which the water is preferably standaridized, i.e., the FAC content of the water is adjusted to the desired normal level, usually 1.0 to 1.5 ppm.

The invention is principally described in connection with the addition of chlorine ion. It is to be understood that all or a portion of the chlorine ion may be replaced by bromine ion. Bromine powder is 3-bromo, 1-chloro, 5,5 dimethyl hydantoin.

For most purposes the algae may be decolorized by adding an amount of chlorine ion which, when combined with the free available chlorine in the water prior to treatment, provides a total chlorine ion content of between about 5 and about 12 ppm.

Although not intended to be bound thereby, the following is offered as a possible theory of what occurs in the practice of applicants' invention. The ammonium and the chlorine react to form chloramines, primarily mono- and dichloramines. The chloramines, by a mechanism that is not understood, are the active agent to decolorize the algae, and in the case of yellow algae, to cause the algae to physically detach from the pool walls. When bromine replaces all or a portion of the chlorine, bromamines are formed by reaction with the ammonium ions.

The amounts of ammonium ion and chlorine ion are controlled so that substantially all of the ammonium and chlorine react to form chloramines and there is very little residual ammonium and chlorine ions in the pool water. During the decolorization process, a colormetric testing of the water will show a free available chlorine content of less than 1.0 ppm. after 1 hour of circulating. After about 14 hours the water will show about 2 ppm ammonium ion, 8 ppm chloramines and less than 1 ppm free available chlorine.

When the decolorization is completed, the water is standardized. Standardization is the process of returning the free available chlorine and other chemicals to the desired level. The pH, alkalinity and cyanuric acid concentrations in the pool are not affected by the disclosed treatment. The free available chlorine is substantially depleted and undesired chloramines are present in the pool water. In order to restore the free available chlorine and destroy the chloramines in as short a time as possible, the water is subjected to what is known as breakpoint chlorination. Breakpoint chlorination is well-known and is discussed in Kirk Othmar, $3^{rd}$ Ed., Vol. 24, pages 430-431, which is incorporated herein by reference. Sufficient chlorine ion is added to cause substantially all of the chloramines to rapidly decompose after which further additions of chlorine ion are made until the standardized level of free available chlorine is reached. It is not absolutely necessary to add additional chlorine to rid the pool of chloramines which slowly decompose over time. However it is preferred to standardize the pool immediately in order to prevent further contamination which can easily occur due to the lack of free available chlorine in the water.

Breakpoint chlorination occurs when the weight ratio of added chlorine ($Cl_2$) to nitrogen (N) in the water exceeds about 10, assuming no other reducible contaminants are present. Accordingly, to insure that sufficient chloramines are initially formed and maintained in the water for a period of time sufficient to effect decolorization, the ratio of $Cl_2$ to N initially added as ammonium and free available chlorine is desirably below about 10, preferably below 7.5. Most desirably, the chlorine to nitrogen ratio is maintained slightly above that which results in maximum formation of chloramines. Thus, high concentrations of chlorine ion should not be used with low concentrations of ammonium ion to insure that breakpoint chlorination does not immediately take place and that the chloramines that are formed remain in the water for the desired period.

The ammonium ion is preferably added in the form of a water-soluble ammonium salt such as ammonium sulfate or ammonium carbonate. Ammonia may be used but is generally to be avoided because of its possible irritation as well as the escape of ammonia gas. The chlorine ion may be added in the form of a water-soluble salt such as calcium hypochlorite, or more preferably by addition of a sodium hypochlorite, i.e., bleach, solution. When bromine is used it is typically added in the form of powder or sticks of 3-bromo, 1-chloro, 5,5-dimethyl hydantoin. It is important that the concentrations of the added chemicals be at low levels so as to avoid hazardous conditions and formation of undesired and possibly harmful compounds.

During the treatment process, the pH of the water should be maintained between about 6.5 and 8. Preferably, the pH should be on the alkaline side, i.e., in excess of 7.0. If the water being treated is too acidic, formation of undesired compounds may occur. Most effective results are obtained at pH values of about 7.5.

The water should be mixed or agitated after addition of the chemicals. In a swimming pool this is accomplished by circulating the water by means of a pump. In general, the water should have a temperature between about 65° F. and 110° F. At higher temperatures the discoloration and removal of algae and stains occurs more rapidly; however, excessive temperatures tend to cause evolution of chlorine and ammonia.

The treatment of the water with ammonium ion and chlorine ion as described clarifies the water so as to give it a crystal clear sparkling appearance in addition to decolorizing and removing algae. The treatment is typically completed within 8 to 24 hours depending upon the temperature, the concentration of the added chemicals, and severity of the algae contamination.

Although the invention has been described in connection with the in situ formation of chloramines in the water by the addition of ammonium ion and chlorine ion, it is also contemplated to separately prepare the chloramines and introduce the prepared chloramines into the water. This may be the method of choice when treating large water bodies.

EXAMPLE I

In a swimming pool containing 10,000 gallons of water, having an initial chlorine ion content of 2 ppm, the circulating pump for the pool was first turned on. The pool was stained with yellow algae along the walls and bottom and the pool water was dull and cloudy in appearance. The pH of the pool water was 7.8. One gallon of a liquid sodium hypochlorite solution containing 10 percent hypochlorite ion was added to the pool. This addition plus the 2 ppm already in the water established a sum total chlorine ion level of 10.53 ppm in the pool. Alternatively, one and one-half pounds of dry sodium hypochlorite could be added to the pool. This would yield a sum total chlorine ion level of 10.57 ppm in the pool. After mixing of the added chlorine and its dispersal throughout the water, one pound of food-grade ammonium sulfate was spread on the water surface at the deep end of the pool, near the drain for the pool. Upon dispersal of the ammonium sulfate, the added ammonium ion was present at a level of about 3.27 ppm. The pool had a temperature of 72° F. and the circulating pump was allowed to operate for 12 hours. At the end of this period, the stains on the sides and bottom of the pool had disappeared and the water was crystal clear. The pH of the pool was 7.8. The chemical balance of the pool was then standarized by the further addition of sodium hypochlorite until the free available chlorine content reached 1.5 ppm.

EXAMPLE II

In a swimming pool containing 10,000 gallons of water, having an initial chlorine ion content of 2 ppm, the circulating pump baskets, filter, and lines were checked to insure maximum circulation of the water, and the pump was turned on. The pool had yellow and green algae color bodies along the walls, incline, and bottom. These areas were stained, and the water was dull or cloudy in appearance. All the water coming back from the pool to the pump was received from the main drain. The pH of the pool water was 7.8, alkalinity 110 ppm, and cyanuric acid level 50 ppm. One pound of food-grade ammonium sulfate was broadcast along the walls and spread over the water surface. Upon dispersal of the ammonium sulfate, the ammonium ion was present at a level of about 3.27 ppm. The pool had a temperature of 72° F. Following the addition of the food-grade ammonium sulfate, one gallon of a liquid sodium hypochlorite solution, containing 20 percent hypochlorite ion, was added giving a sum total chlorine ion content of 24.44 ppm. The circulation pump was allowed to operate 24 hours.

At the end of this period, the yellow and green color bodies which existed on the walls, incline, and bottom had disappeared without any brushing and the water was crystal clear. The pH of the pool was 7.8, the alkalinity was 110 ppm, and the cyanuric acid level was 50 ppm. It is desirable to repeat the treatment in 30 to 60 days, depending upon the development of color and stains. The chemical balance should be returned to normal after the 24-hour period by the addition of further amounts of chlorine ion.

EXAMPLE III

Example I indicates the use of chlorine in combination with ammonium sulfate. Bromine can also be used as effectively as chlorine for the treatment of the swimming pool. In accord with this example, one-half pound of bromine powder (3-bromo, 1-chloro 5,5-dimethyl hydantoin) is added to the pool containing 10,000 gallons of water to establish a sum total chlorine ion plus bromine ion level of about 2.75 ppm in the pool. After mixing the bromine throughout the pool water, ammonium sulfate is charged into the pool water as described in Example I, and similar results are achieved.

EXAMPLE IV

Example II indicates the use of chlorine in combination with ammonium sulfate. Bromine can also be used as effectively as chlorine for the treatment of yellow and/or green color bodies' stain in the swimming pool. Following the procedure outlined in Example II, the ammonium sulfate is broadcast into the pool. Bromine is charged into the pool water through a chemical feeder at a rate of one pound per 10,000 gallons of water to establish a sum total free available bromine and chlorine level of about 5.5 ppm in the pool. This is accomplished within 24 hours. The pool circulating system remains on for the next 24 hours and similar results are achieved as in Example II.

The process of the invention safely cleans up color bodies and stains in water bodies in short times with resulting reduction in slipperiness. This is effected without brushing or other laborious removal of the stains. The process is simply practiced and readily learned.

The various features of the invention which are believed to be new are set forth in the following claims:

What is claimed is:

1. A method for decolorizing color bodies in swimming pool water comprising establishing in said pool water a concentration of chloramines sufficient to decolorize said color bodies, said chloramines resulting from the addition to said pool water of between about 2 and about 10 ppm ammonium ions and between about 2.75 and 24.44 ppm chlorine ions, the level of addition of said ions to said pool water being selected to cause the free available chlorine content of said pool water to be substantially depleted.

2. A method in accordance with claim 1 wherein the chemical balance of said pool water is returned to normal after decoloration of said color bodies is completed.

3. A method in accordance with claim 2 wherein said pool water is maintained at a temperature of between about 55° F. and about 110° F.

4. A method in accordance with claaim 3 wherein said pool water has a pH between about 7.5 and about 8.2.

5. A method in accordance with claim 2 wherein said pool water has an alkalinity of between about 80 ppm and about 120 ppm and a cyanuric acid content of between about 25 ppm and about 75 ppm.

6. A method in accordance with claim 1 wherein the source of ammonium ion is ammonium sulfate.

7. A method in accordance with claim 6 wherein the source of chlorine ion is selected from sodium hypochlorite and calcium hypochlorite.

8. A method for decolorizing color bodies in swimming pool water comprising establishing in said pool water a concentration of bromamines sufficient to decolorize said color bodies, said bromamines resulting from the addition to said pool water of between about 2 and about 10 ppm ammonium ions and between about 2.75 and about 24.44 pm bromine ions, the level of addition of said ions to said pool water being selected to cause the free available bromine content of said pool water to be substantially depleted.

9. A method in accordance with claim 8 wherein the chemical balance of said pool water is returned to normal after decoloration of said color bodies is completed.

10. A method in accordance with claim 9 wherein said pool water is maintained at a temperature of between about 55° F. and about 110° F.

11. A method in accordance with claim 10 wherein said pool water has a pH between about 7.5 and about 8.2.

12. A method in accordance with claim 9 wherein said pool water has an alkalinity of between about 80 ppm and about 120 ppm and a cyanuric acid content of between about 25 ppm and about 75 ppm.

13. A method in accordance with claim 8 wherein the source of ammonium ion is ammonium sulfate.

14. A method in accordance with claim 13 wherein the source of bromine ion is 3-bromo, 1-chloro, b 5,5-dimethyl hydantoin.

* * * * *

UNITED STATES PATENT AND TRADEMARK OFFICE
CERTIFICATE OF CORRECTION

PATENT NO. : 4,614,595

DATED : September 30, 1986

INVENTOR(S) : Michael Azzarella and Frederick L. Luth

It is certified that error appears in the above-identified patent and that said Letters Patent is hereby corrected as shown below:

Column 6, line 26, "Claim" is misspelled.

Column 6, line 45, "pm" should be --ppm--.

Column 6, line 65, after "1-chloro" delete --b--.

Signed and Sealed this

Twentieth Day of January, 1987

Attest:

DONALD J. QUIGG

Attesting Officer

Commissioner of Patents and Trademarks